Jan. 3, 1961 J. H. KRESS 2,966,767
METHOD OF MAKING MULTIFOCAL LENSES
Filed Feb. 26, 1957 5 Sheets-Sheet 1

INVENTOR
JOHN H. KRESS
BY
*Louis L. Gagnon*
ATTORNEY

Jan. 3, 1961 J. H. KRESS 2,966,767
METHOD OF MAKING MULTIFOCAL LENSES
Filed Feb. 26, 1957 5 Sheets-Sheet 2

INVENTOR
JOHN H. KRESS
BY
Louis L. Gagnon
ATTORNEY

Jan. 3, 1961   J. H. KRESS   2,966,767
METHOD OF MAKING MULTIFOCAL LENSES
Filed Feb. 26, 1957   5 Sheets-Sheet 4

INVENTOR
JOHN H. KRESS
BY
Louis L. Gagnon
ATTORNEY

Jan. 3, 1961  J. H. KRESS  2,966,767
METHOD OF MAKING MULTIFOCAL LENSES
Filed Feb. 26, 1957  5 Sheets-Sheet 5

INVENTOR
JOHN H. KRESS
BY
Louis L. Gagnon
ATTORNEY

United States Patent Office 2,966,767
Patented Jan. 3, 1961

2,966,767

METHOD OF MAKING MULTIFOCAL LENSES

John H. Kress, Quinebaug, Conn., assignor to American Optical Company, Southbridge, Mass., a voluntary association of Massachusetts Filed Feb. 26, 1957, Ser. No. 642,450

5 Claims. (Cl. 51—284)

This invention relates to improvements in lens manufacturing techniques and has particular reference to the provision of novel means and method of simultaneously forming a plurality of one-piece multifocal lenses of the type having wide focal fields and a relatively straight line of division between said fields.

In the manufacture of multifocal lenses, it has been found that superior lenses may be obtained by forming the desired focal fields upon a single piece of lens medium. In such a case, the usual difficulties of expansion, interfacial defects, chromatic aberrations, etc. common to the fused type of multifocal lenses may be avoided. However, the manufacture of one-piece multifocal lenses has heretofore involved complicated and time consuming processes which have economically restricted their marketing. For this reason, it is a principal object of the present invention to provide a new and improved simplified process and apparatus for simultaneously producing a plurality of one-piece multifocal lenses having controlled optical characteristics and a relatively straight transversely extending line of division maintained at a practical minimum height between said focal fields of the lenses.

Another object is to provide simple, accurate and more expedient means and method of producing lenses of the above character wherein the power introduced in the respective fields and the related optical centers thereof may be precisely controlled.

Another object is to provide novel means and method of forming from a single piece of lens medium, a monaxial multifocal lens wherein the optical centers of the distance and reading fields are substantially coincident and said fields are separated by a substantially straight line of division extending transversely across said piece of lens medium and substantially intersecting the optical centers of said fields.

A further object is to provide a new and improved simplified process of simultaneously producing a plurality of one-piece multifocal lens blanks which overcomes the difficulties usually encountered in the complicated and time consuming prior processes of forming each of said lens blanks individually and which further overcomes the past difficulties of objectionable glass flaking at the shouldered line of division between the focal fields thereof and thus provides a substantial reduction in the time required for the finishing of such lens blanks and, consequently, an increased rate of production and greater economy.

Another object is to provide novel means and method of simultaneously forming a plurality of lens blanks of the above character in such manner as to substantially reduce the heretofore time required for finishing by initially providing each of said blanks with a semi-finished reference surface and thereafter finishing the individual focal fields of said plurality of blanks relative to said reference surface.

Another object is to provide novel means and method of avoiding glass edge flaking at the shouldered dividing line of finished lens blanks of the above character.

A still further object is to provide new and improved apparatus and a relatively rapid, economical process of simultaneously producing a plurality of multifocal lenses of the above type wherein the process includes the steps of rough abrading a side surface of a plurality of lens blanks to approximately the desired curvature of the distance viewing field to be formed thereon, blocking said lenses about the periphery of a selected wheel-type block, rough and fine milling and optically polishing approximately one-half the area of said side surfaces of the blanks to the precise curvature desired of the reading portion thereof and simultaneously producing a shouldered line of division between the distance and reading field areas, deblocking said blanks and reblocking same in a double row about the periphery of a second preselected wheel-type block with the remaining rough abraded surfaces thereof in adjacent side-by-side relation with each other, milling said remaining surfaces to the precise curvature desired of the distance viewing portion of the lenses and to a depth sufficient to produce a practical minimum height at the shouldered line of division between the focal fields and polishing said distance viewing portions of the blanks to a high degree of optical perfection.

Other objects and advantages of the invention will become apparent from the following description when taken in conjunction with the accompanying drawings in which.

Figure 1:
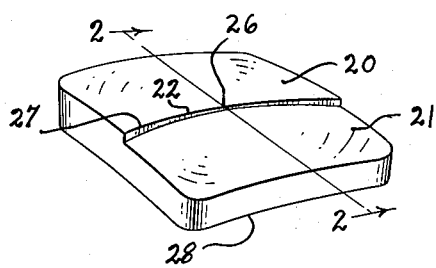
Fig. 1 is a perspective view of a lens blank formed in accordance with the invention.

Referring more particularly to the drawings wherein like characters of reference designate like parts throughout the various views, one form of a finished lens blank embodying the invention is shown in Fig. 1 and comprises a single piece of lens medium, preferably optical crown glass or other transparent material, having an upper or distance field 20 and a lower or reading field 21. The fields 20 and 21 are separated by a substantially straight dividing line 22 which passes through the optical axis of the lens blank so as to provide said lens blank with a wide reading field 21 extending transversely throughout the width thereof.

Figure 2:
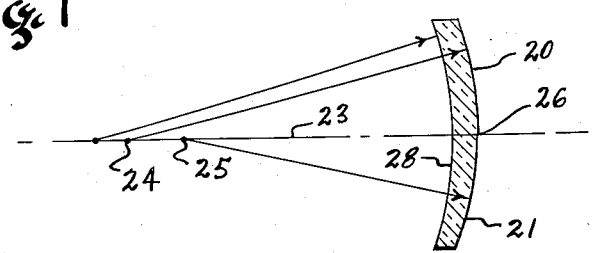
Fig. 2 is a sectional view of the lens blank taken on line 2—2 of Fig. 1 looking in the direction of the arrows and including a diagrammatic illustration of the centering of its different focal fields.

Referring more particularly to Fig. 2, wherein dot-dash line 23 represents the optical axis of the finished lens blank, it can be seen that the center of curvature 24 of the distance field 20 and the center of curvature 25 of the reading field 21 both lie on axis 23 and the optical centers 26 will, therefore, be in monaxial relation with each other as illustrated in Figs. 1 and 2. Moreover, it is to be noted that the centers 24 and 25 of the surface curvtures of fields 20 and 21, respectively, are so positioned along the optical axis 23 as to provide a near mergence or very slight shouldering at the optical centers 26 and thus cause the dividing line 22 to be reduced to a practical minimum height adjacent said centers. The above mentioned relation of the optical centers 26 substantially eliminates the error of "jump" when the line of vision of the eye passes from one field to the other. Dividing line 22, however, produces a ledge 27 which progressively increases in height toward the outer edges of the lens blank, which height is determined by the difference in curvatures of fields 20 and 21.

The finished lens is formed from the lens blank by providing its opposite side 28 with a finished optical surface of a curvature which, is such that when combined with the curvatures of fields 20 and 21, will give the required prescriptive powers in said fields. The final thickness of the lens is determined by the depth to which surface 28 is formed.

It is to be understood that the term "multifocal" as used in this specification and accompanying claims is intended to mean lenses having two or more focal fields. In the description immediately following, the process of manufacturing lenses having only two focal fields, namely a distance portion and a reading portion, will be discussed. However, it will become apparent that lens blanks having more than two focal fields may also be manufactured by said process.

In order to simplify the following description, the surface curvature of the above mentioned distance portion and reading portion will be referred to as the DP and RP curves, respectively.

Figure 3:
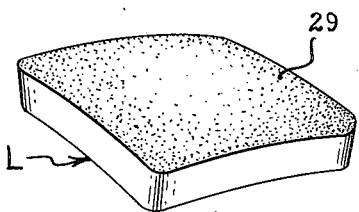
Fig. 3 is a perspective view of a lens blank having one of its side surfaces rough abraded in accordance with the invention.

In carrying out the present invention, a plurality of lens blanks L, one of which is illustrated in Fig. 3, are provided. The convex surface of said blanks, in this case, are initially provided with an accurately rough ground or semi-finished reference surface 29 by any one of the known standard methods of lens grinding which preferably incorporate the use of a multiple blocking arrangement for reasons of economy. The surface 29 of blanks L is accurately ground to substantially the curvature desired in the distance portion of the finished lens blank to be ultimately formed therefrom. The selection of blanks L further includes the choice of semi-finished DP curves in accordance with the powers desired in the distance viewing portion of the resultant lens since the upper portion of said semi-finished surfaces will ultimately be optically finished to substantially the same curvature and become the distance viewing portion of the finished multifocal lens as will become apparent from the description to follow.

Figure 4:
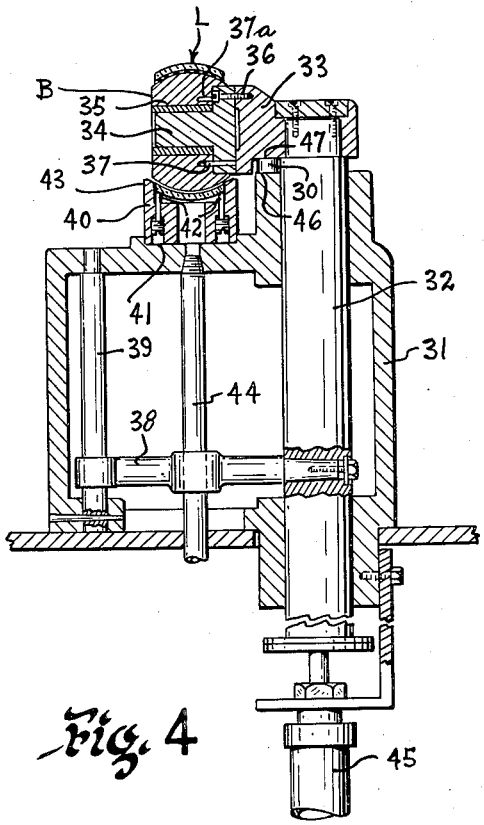
Fig. 4 is a side sectional view of one preferred form of lens blocking apparatus of the invention.

Upon having made the selection of blanks L in accordance with the curvature of surface 29, said blanks are mounted in a single row about the periphery of a wheel-type block B such as shown in Figs. 4, 7, 8 and 9 of the drawings. To accomplish this, the blocking mechanism of Fig. 4 is used.

The size of block B, however, must be selected in accordance with the particular surface curvature to be provided upon the reading field of the blanks L which are mounted thereon. That is, the radial distance from the axis of rotation of the block to the lens blank mounting surface thereon must be controlled in accordance with the desired radius of curvature to be applied to the reading field so as to permit a relatively thin layer of pitch or other suitable adhesive to be applied between the lens blanks L and said mounting surface of the block. In order to maintain a desired radial distance from the axis of rotation of the block to the ultimate reading portion surface 21 to be formed on the blanks L, which radial distance is equal to the radius of curvature of the RP curve, spacer stops 30 specifically designed for each change in added power of the RP curves are used in conjunction with the blocking mechanism of Fig. 4. By so controlling the size of block B and the thickness of the spacer stops 30, it will become apparent that the thickness of the pitch or adhesive between said blanks and block is maintained consistently relatively thin throughout the range of the various sizes of blocks required for mounting blanks L. In this respect, any shrinkage of the pitch during its hardening would be negligible and would not adversely affect the subsequent grinding procedure.

The blocking mechanism of Fig. 4 comprises a base 31 having a vertically extending block carrying shaft 32 mounted for reciprocal movement therein. The upper end of shaft 32 is provided with a right-angled forwardly extending block supporting arm 33 rigidly secured thereto and having a reduced axle portion 34 of a diameter precisely controlled to intimately receive the hub portion 35 of a wheel-like block B. In addition, the axle portion 34 is rigidly mounted on arm 33 by studs 36 with its longitudinal axis normal to the longitudinal axis of shaft 32 and is provided with a locating pin 37 which is adapted to engage one of a plurality of matching orifices 37a in block B to prevent rotation of said block relative to said axle portion 34 and for purposes of indexing block B relative to the base 31 when applying lens blanks thereto as will be described immediately hereinafter.

In order to restrict shaft 32 from rotation and thus maintain axle portion 34 in a fixed location relative to the base 31, a restraining arm 38 is secured at one end to shaft 32 and has its opposed end slidably mounted on a vertical guide spindle 39 which, in turn, is rigidly secured in the base 31.

A removable blocking mold 40 generally square in shape is positioned in a recessed portion 41 of the base 31 and has its central axis aligned with a line passing through the center of the width of the block B and intersecting the axis of rotation of axle portion 34. Mold 40 is provided with lens location pins 42 of uniform length in each corner thereof with which the reference surface 29 of each blank engage and for supporting a lens blank in a given horizontal plane and has upwardly extending side portions 43 for engaging the edge of said lens blank and locating the center thereof in the above described axial relation with the block B.

It is pointed out, however, that mold 40 may be of any desired shape which shape would be dependent upon contour shape of the lens blanks to be used therewith.

The blocking mechanism is further provided with a vacuum line 44 which is connected to the blocking mold recessed portion 41 and with suitable vacuum creating means not shown for the purpose of setting up a vacuum of an amount sufficient to retain the blank on the pins 42. An air cylinder 45 or any other suitable motivating means is connected to shaft 32 for the purpose of pneumatically moving said shaft and block B toward or away from the blocking mold 40.

Operation of the blocking mechanism is as follows:

Each of the lens blanks L to be mounted on block B is provided with a suitable bonding agent upon the surfaces thereof opposed to the previously mentioned semifinished reference surfaces 29. In the case of the particular process illustrated and described herein, the bonding agent would be applied to the concave surfaces of the blanks. Although various types of bonding agents and methods of applying same to the blanks may be used, it has been found preferable to place a pellet or wafer of pitch or the like on the concave surface of each of the lens blanks and, in turn, place said lens blanks in a suitable oven or heating chamber to controllably heat and soften the pitch. The blanks are then removed, one at a time, from the heating chamber and placed in the blocking mold 40 with the convex semifinished reference surface 29 resting on pins 42.

Attachment of a particular lens blank to the mounting surface of the block B is then accomplished by causing shaft 32 to be drawn downwardly by proper actuation of air cylinder 45. Block B will then engage the softened pitch. However, since it is necessary to control the radial distance from the axis of the block to the semifinished surface 29 of the blank in accordance with the desired radius of curvature to be subsequently applied to the reading portion thereof, which radius will be equal to the desired radius of the RP curve, a removable spacer stop 30 of a controlled thickness is placed upon the shouldered portion 46 of the base 31 so as to be engaged by the under surface 47 of the arm 33 and thus limit the extent of downward movement of shaft 32 to locate the axis of block B at a predetermined point above the lens blank L in blocking mold 40.

Since each desired change in power of the RP curve requires a change in the radial distance from the axis of block B to the semifinished surface 29 of the blanks mounted thereon, a particular spacer stop 30 of a controlled thickness is provided for each RP change within the range of powers which may be used with a particular block B.

It can then be seen that by controlling the distance from the tops of pins 42 in mold 40 to the plane of shoulder 47 and by the proper selection of the thickness of spacer stop 30, the desired RP radius is obtained. The remaining space between the concave surface of the blank L, in mold 40, and the mounting surface of block B will be filled by the pitch.

The vacuum line 44 is used to create a partial vacuum internally of mold 40 and thus retain the lens blank in proper seated relation upon pins 42 during the blocking operation.

The above blocking operation is repeated by actuating air cylinder 45 and causing shaft 32 and block B to be raised and lift the lens blank now attached thereto out of mold 40 since the hardening and adherence of the pitch is sufficient to overcome the holding force of the vacuum created internally of mold 40. Additional blanks are positioned one at a time in mold 40 in the above manner. Block B is indexed to a clear position on the mounting surface thereof prior to each application of a lens blank by partially withdrawing block B outwardly longitudinally of axle 34 an amount sufficient to clear the locating pin 37, rotating said block B to a position on the mounting surface thereof which will be aligned with a second orifice 37a, and then pushing the block inwardly whereupon locating pin 37 will engage in said second orifice 37a to properly locate block B relative to mold 40 and the operation described above is repeated for each lens blank until the desired number of lens blanks are mounted.

It is pointed out that the number of lens blanks which may be applied to a particular block is dependent upon the RP radius and also the size and lens blanks to be applied thereto. Moreover, the lens blanks are preferably positioned in close edge-to-edge relation about the lens block mounting surface and if the related sizes of the block and lens blanks are such as to leave a relatively wide spacing between the first and last lens blanks, it is also preferable to fill said space by similarly mounting a glass filler therebetween, this provides a substantially continuous glass surface to be abraded and polished in the operations to follow and allows the abrading and polishing tools to pass over said space without sharply striking the edges of the adjacent lens blanks.

It is also pointed out that in order to maintain the above-mentioned distance from the top of pins 42 in mold 40 to the plane of shoulder 46 substantially constant, in connection with each change in block size, it is necessary to provide an individual mold 40 of the proper height and having proper length of pins to bring about this result. The block size is determined by the RP curve of the lens blanks to be processed thereon, as described hereinabove.

Figure 7:
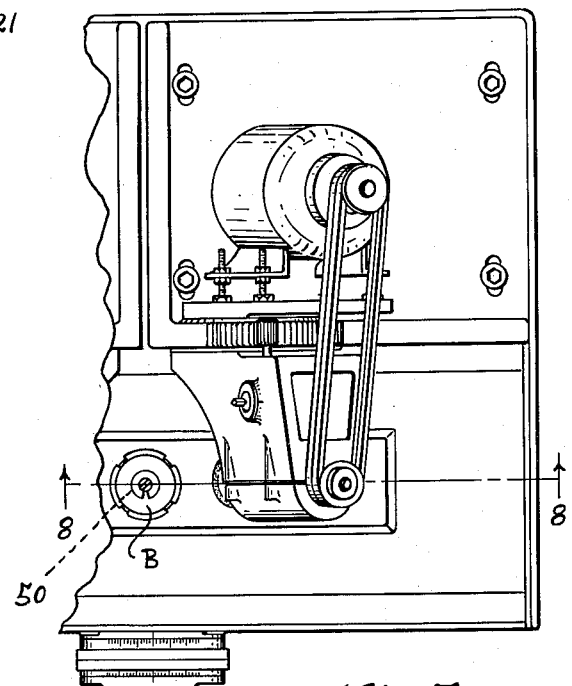
Fig. 7 is a fragmentary top plan view of one of the lens milling devices of the invention.
Figure 8:
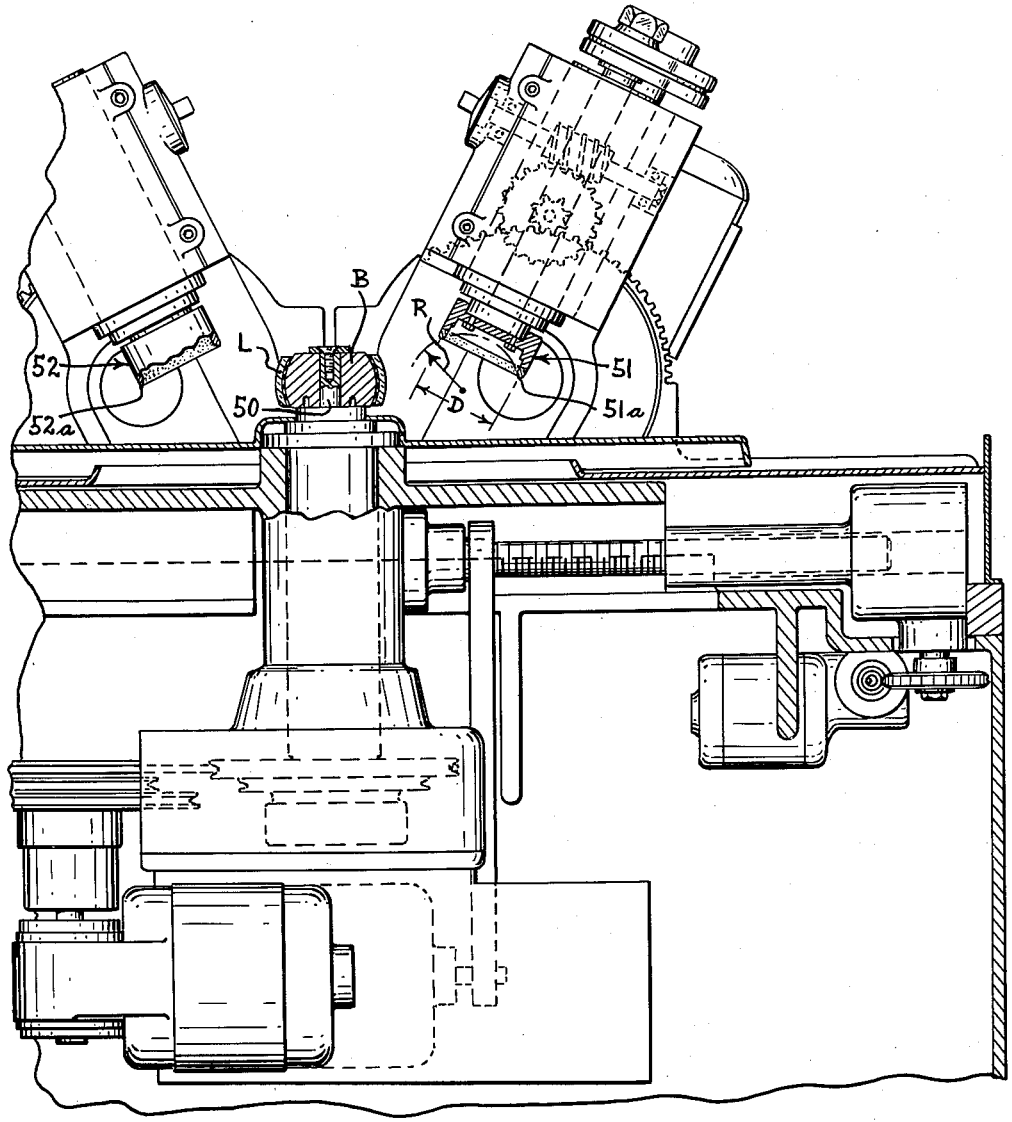
Fig. 8 is a fragmentary vertical sectional view taken substantially on line 8—8 of Fig. 7.

After having blocked the lens blanks in the above manner, the block B is then removed from the blocking device and the desired RP curve is generated upon a portion of the semifinished surfaces 29 of the lens blanks L in the following manner:

Block B and attached lens blanks L are secured on one end of and in axial alignment with a rotatable spindle 50 of the lens surface abrading device, illustrated in Figs. 7 and 8 of the drawings. Spindle 50 is initially positioned substantially midway between a pair of rotatable angled cup-shaped rough and fine, preferably diamond charged, abrading tools 51 and 52 respectively. Said tools are each adapted to be pivoted at points 51a and 52a respectively and angled with respect to spindle 50 so as to have their axes of rotation in a common plane with, and each intersecting said axis of spindle 50. Furthermore, the pivot points 51a and 52a are each located at the lowest point on the cutting edge of the respective tools, and since it is desired that the dividing line 22 be formed to extend transversely through the ultimate location of the optical centers 26 of the lens blanks L, the pivot point 52a of the fine or finish abrading tool 52 is positioned so as to lie in a horizontal plane passing through said ultimate location when block B is positioned upon spindle 50, as illustrated best in Fig. 8. Pivot point 51a, however, is positioned slightly above said horizontal plane preferably about 3/64 of an inch to cause the cutting edge of the coarse or rough abrading tool to initially form said dividing line 22, on lens blanks L, slightly above the ultimate location of the optical centers 26 thereof.

This slightly raised condition of tool 51 is provided to protect the immediate area in which the dividing line 22 is to be finally formed by tool 52 from damage due to possible glass flaking which might be caused by the coarseness of the abrading particles of tool 51. It is pointed out that tool 51 being of a relatively coarse type, is used to form only the general shape of the final RP curve as will become apparent from the description to follow.

Tools 51 and 52 are provided with a controlled diameter D and radius of curvature R, Fig. 8, upon the cutting edges thereof, diameter D and radius R and the angle of tilt of the tools being controlled to produce the radius of curvature of the RP curve to be abraded on blanks L. A particular pair of tools 51 and 52 is provided for each desired change in RP curvature and the radius R of said tools is designed to cause a true spherical RP curvature to be abraded from the dividing line 22 of blanks L to the outer edges thereof when the tools are properly angled with respect to the axis of spindle 50.

The extent to which tools 51 and 52 are angled with respect to the axis of spindle 50 is geometrically determined by the ultimate RP curve desired to be abraded upon the blanks L. That is, for example, if it is desired to provide the blanks L with an RP curve of a 76.335 mm. radius, the tools 51 and 52 selected would have a cutting edge diameter of 3.125 inches, a radius R of 76.335 mm. and the rough abrading tool 51 would be set at an angle of 32° 13′ from the axis of spindle 50, and the fine abrading tool 52 would be set at an angle of 31° 19′ from the axis of spindle 50. However, if it is desired to provide blanks L with an RP curve of a 66.769 mm. radius, the tools 51 and 52 would be selected to have a diameter D of 3.125 inches, a radius R of 66.769 mm. and tool 51 would be angled to 37° 29′ whereas tool 52 would be angled to 36° 28′, etc.

It is pointed out that the tool dimensions and angular settings are precisely calculated for each RP curvature required by the optical profession and that three major factors are necessary to abrade the desired RP curve on the lens blanks L. These factors are: first, blocking the blanks to provide a predetermined radial distance from the axis of rotation of the block to the outer surfaces of the blanks; second, selecting tools having the proper cutting edge diameters D and radii R and, third, properly angling each of the abrading tools with respect to the axis of rotation of the block so as to abrade in the transverse meridian of the blanks a radius of curvature which is substantially equal to the radius of curvature abraded in a meridian normal thereto and resulting from the diameter of the block or location of the reference surfaces 29 from the axis of rotation of the block. This is to cause said RP surfaces to be spherical in power.

By referring to "the diameter of the cutting edge of the abrading tools," it is intended to mean the diameter D, Fig. 8, measured at the apex of the leading abrading edge portion thereof.

The RP curve is then produced on the lens blanks L by causing the rotating spindle 50 and blocked lens blanks L attached thereto to be moved transversely in the above-described common plane with the axes of rotation of the abrading tools, so as to first engage the rough abrading tool 51 whereupon the abrading action of the tool 51, due to its rotation and the rotation of lens blanks L about the axis of block B, will cause the straight line of division 22 and the ledge 27 to be formed simultaneously with the forming of the RP curve which curve is controlled by the shape and angle of the tool and the radial distance from the axis of block B to the surfaces of blanks L. Said transverse movement is continued until the desired depth of cut is obtained. Since the tool 51 is of a coarse or rough abrading type which is used to form only the general shape of the ultimate RP curve for purposes of expediting the abrading operation, the rotating spindle 50 is next caused to retract from tool 51 and is moved in the opposite direction along said common plane an amount sufficient to cause the blanks L to engage the tool 52 which is, in turn, the fine abrading tool. Spindle 50 is caused to continue its transverse movement in the direction of tool 52 until a predetermined depth of finish cut is accomplished which depth of cut is controlled to provide a sufficient depth to ledge 27 which will permit the distance portion 20 to be subsequently fine ground and polished to a point where the RP and DP curvatures will nearly merge at the ultimate location of the optical centers 26 of each of the finished lens blanks. At this point, the spindle 50 is caused to retract from tool 52 and assume its initial position between tools 51 and 52. It will be noted that due to the relative vertical positions of the tools 51 and 52 and the blocked blanks L, that approximately one-half of the side area of the blanks L is provided with the RP curve and the remaining half has the untouched semi-finished surface 29 thereon. This surface 29 ultimately becomes the distance viewing portion of the finished lens.

Figure 6:
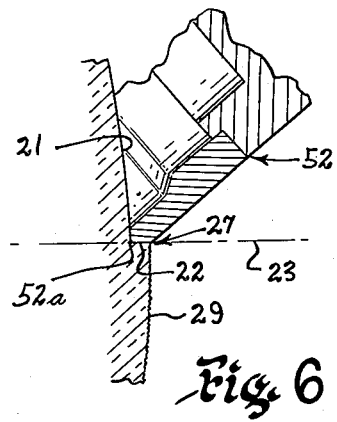
Fig. 6 is a diagrammatic illustration of the milling of a portion of the lens blanks of the invention.

Referring more particularly to Fig. 6 which diagrammatically illustrates the forming of the ledge 27 on lens blanks L during the abrading of the reading portion 21, it will be noted that the ledge 27 is finally finished by tool 52 to have its surface lie in the plane of the optical axis 23 of the lens blanks L which plane is also coincident with the pivot point 52a of the abrading tool 52.

Since it is preferred to have the plane of the surface of ledge 27 substantially coincident with said plane of the optical axis 23 so as to prevent the undesired effects of prism displacement when the line of vision of the wearer's eye passes over ledge 27 while shifting from one focal field to another, the abrading edge portions of tools 51 and 52 are formed to controlled angular shapes for each change in RP curve to be abraded. That is, a different set of tools 51 and 52 each having a proper angularly shaped cutting edge portion is selected in accordance with the degree of tilt required to produce the desired RP curve and the said angle, in each instance, is such as to cause the resultant ledge 27 of the dividing line 22 to be formed in a plane parallel with the axis 23 and lying on said axis.

It will be noted in the previously described examples of the angular settings of tools 51 and 52 that the angular setting of the rough abrading tool 51 for each particular RP curve is approximately one degree greater than that of the fine or finish abrading tool. This increased tilting of tool 51 about pivot 51a, in effect geometrically causes the rough RP curve to be formed at substantially the same radius of curvature as the fine RP curve which is abraded by tool 52 regardless of the above-mentioned slightly raised condition of tool 51 which prevents possible slight flaking of the glass from reaching and damaging the ultimate dividing line 22 of the lens blanks L.

It is particularly pointed out that due to the fact that the lowermost ends or apices of the cutting edges of the tools are located on the axis of the pivots 51a and 52a, as shown more particularly in Fig. 8, no shifting of the position of said lowermost ends or apices with respect to said axes takes place during the angling of the tool.

The block B is next removed from spindle 50 and the final finishing of the RP curvatures is accomplished by a polishing operation.

The above described abrading procedure, however, is automatically performed by the device of Figs. 7 and 8 in the manner described in detail in the Dalton copending application, Serial No. 566,688, filed February 20, 1956, now Patent No. 2,890,551.

Figure 9:
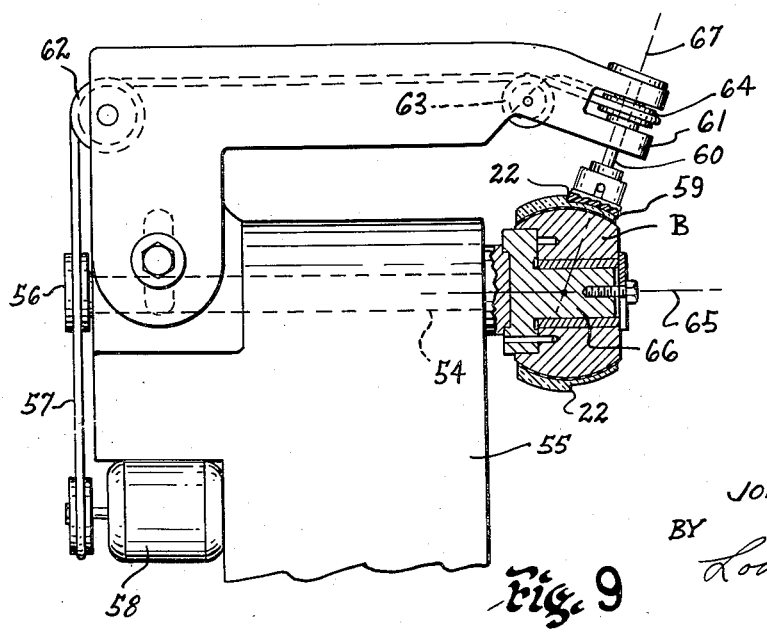
Fig. 9 is a fragmentary side view, partially in section, of one type of lens blank polishing apparatus of the invention.

Having abraded the RP curve on lens blanks L in the manner described above, block B is removed from the device of Figs. 7 and 8 and the RP surfaces 21 are optically polished by means of a suitable polishing apparatus diagrammatically illustrated in Fig. 9 wherein the block B is secured to one end of a rotatable shaft 54 journaled in a base 55 of said apparatus. Shaft 54 is powered by a pulley 56 and belt 57 which is connected to an electric drive motor 58 or the like. A circular polishing pad 59, having a lens blank engaging surface preformed to substantially match the spherical curvature of the reading field 21 of the blanks to be polished and being preferably formed of a suitable plastic composition or any one of the conventional polishing materials, is positioned in engaging overlying relation with the above mentioned RP surfaces of blanks L. Pad 59 is mounted at one end of a supporting spindle 60 which is journalled in an angularly disposed supporting head 61 and is rotated about its axis by belt 57 which travels over two pairs of pulleys 62 and 63 and over a drive pulley 64 secured to shaft 60. It will be noted that belt 57 is arranged to simultaneously rotate both spindle 60 and shaft 54.

Since the center of curvature of the abraded RP curve on lens blanks L is located along the axis of rotation 65 of block B at the intersection 66 of a normally related plane through the dividing line 22 of blanks L, it will be noted that the axis 67 of the spindle 60 is tilted about said center of curvature 66 so as to cause the lens engaging surface of pad 59 to properly seat upon the RP surfaces of blanks L. The polishing procedure is then accomplished by rotation of block B and pad 59 during the application of a conventional type of polishing medium between said lens blank surface and polishing pad. With the proper selection of a polishing medium and pad 59 a relatively high speed polishing operation may be accomplished.

Upon completion of the above polishing operation, the lens blanks L are removed from block B.

Figure 5:
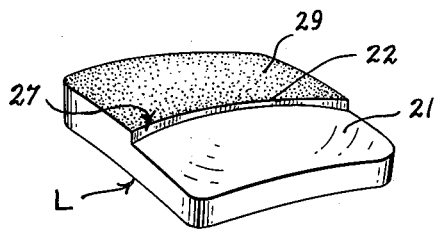
Fig. 5 is a perspective view of a lens blank partially finished in accordance with a particular step in the process of the invention.

It is particularly pointed out that the blanks L have now taken the form substantially as illustrated in Fig. 5 wherein the upper half of each of said blanks has remained untouched and still embodies the rough ground or semi-finished reference surface 29 which will ultimately become the distance portion of the finished blank and the lower half of the blank now has the optically finished RP curvature 21. The ledge 27, between said upper and lower surfaces 29 and 21, however, is relatively great in height so as to permit a desirable amount of stock to be removed from surface 29 during the fine grinding and polishing operations to follow, which operations will cause the ledge 27 to be so reduced in height as to provide a practical minimum height or substantially flush relation of the RP and DP surfaces at the optical center 26 of the finished blank. The height at the optical center is preferably such, for example, to be no more than from .030 to .200 millimeter.

In order to finish the distance portion of the blanks L in the manner just described, said blanks are next blocked about the periphery of another wheel type block "C," Figs. 11, 12, 13 and 14, which is generally similar to block B while being of a size sufficient to accommodate a double row of blanks L in staggered side-by-side relation with each other about its periphery.

This double row blocking greatly increases the rate of production, in the steps to follow, by doubling the output while requiring practically no additional time for blocking than would be the case in a single row blocking procedure.

Figure 10:
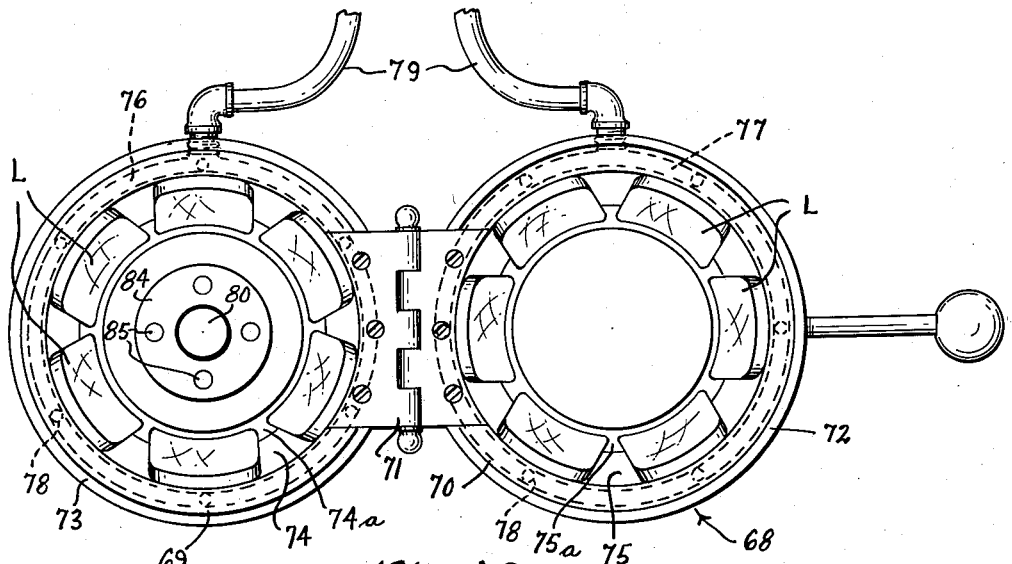
Fig. 10 is a top plan view of a lens blocking mold of the invention illustrated in its opened position of use.
Figure 11:
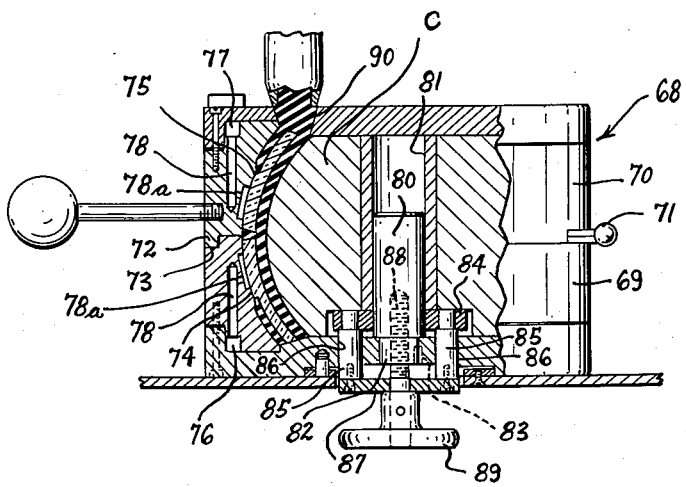
Fig. 11 is a side view of the device of Fig. 10, partially in section, shown in its closed position of use and diagrammatically illustrating its function.

To perform the double row blocking operation, a blocking mold 68 such as illustrated in Figs. 10 and 11 is used. Referring more particularly to Fig. 10, it can be seen that mold 68 comprises a pair of relatively thick walled hollow circular mold halves 69 and 70 pivotally connected together by a suitable hinge member 71 whereby mold half 70 when swung about hinge 71, will fit in perfect overlying registry with mold half 69. To insure such registry, a lip 72 is provided about the annular edge portion of mold half 70 which is adapted to interfit with a matching recessed shoulder 73 about the annular edge portion of mold half 69 when said mold halves are in closed relation with each other as shown in Fig. 11. The hollow interiors of each of the mold halves 69 and 70 then form an internal cavity in which the lens blanks to be blocked and the block C are contained during a blocking operation. The inner annular side walls 74 and 75 of mold halves 69 and 70, respectively, are formed to a curvature substantially matching the curvature of the reference surfaces 29 of lens blanks L whereby blanks L when placed in each of the mold halves, with the surfaces 29 thereof in engaging relation with walls 74 and 75, will be concentrically arranged at a predetermined radial distance from a predetermined centrally located axis in each of the mold halves. The bottom of the mold halves, as viewed in Fig. 10, are each provided with a sloping annular seat 74a and 75a shaped to receive the reading portion lower edge of each of the blanks L. The depth of said seats 74a and 75a being controlled in accordance with the height of the particular blanks L to be blocked as to cause the upper edges of said blanks L to be in close adjacent relation with the upper edges of each of the sidewalls of mold halves 69 and 70 when said blanks are positioned in the mold halves in the manner illustrated in Fig. 10. This, of course, causes the upper edge portions of blanks L to assume a close edge to edge relationship when the mold halves are in closed relation with each other as in Fig. 11.

It will be noted, Fig. 10, that the blanks L in mold half 69 are in offset or staggered relation with the blanks L in mold half 70 so as to ultimately locate the blanks L in double row staggered side-by-side relation about the periphery of block C. This arrangement provides a more nearly continuous glass surface to be abraded and polished and eliminates the possibility of the abrading tool or polishing tool from sharply striking the edges of adjacent lens blanks during their respective operations since said tools are of a size sufficient to overlap at least a pair of blanks L as will be discussed in greater detail hereinafter.

In order to retain the lens blanks L in the above mentioned related positions in mold halves 69 and 70 during the molding operation, a vacuum system comprising annular troughs 76 and 77 is provided in the side walls of mold halves 69 and 70, respectively. Each of said troughs 76 and 77 are further provided with a plurality of lateral openings 78 and 78a, Fig. 11, which are arranged to communicate with the surface 29 of each of the blanks L when said blanks are properly arranged in the mold halves in the manner illustrated in Figs. 10 and 11. By evacuating the air from troughs 76 and 77 and openings 78, 78a through the use of any known conventional vacuum means which may be connected by hoses or the like 79 to each of the mold halves, the blanks L will be drawn securely against walls 74 and 75 and held so during the entire blocking operation.

The bottom part of mold half 69 is provided with a vertically extending stub shaft 80 centrally aligned therein which is adapted to intimately receive the hub 81 of a block C when said block is positioned thereover as shown in Fig. 11. Shaft 80, having a reduced shouldered lower end 82 is rigidly secured in the bottom of mold half 69 by means of a set screw or the like 83. A circular collar member 84 is slidably mounted about the body portion of shaft 80 by means of a plurality of vertically extending pin members 85 slidably mounted through complementary openings 86 in the bottom of mold half 69. Collar member 84 then acts as a knock-out means for extracting block C upon completion of a blocking operation. To accomplish this, the lower ends of pin members 85 are each secured to a plate 87 in which a lead screw 88 having an operating handle 89 is centrally rotatably mounted. Screw 88 is then threadedly engaged longitudinally in shaft 80 and upon rotation thereof in the proper direction by means of handle 89, collar 84 will be forced upwardly against block C and cause said block to rise out of mold half 69. Rotation of screw 88 in the opposite direction will cause collar 84 to retract and permit a second block C to be inserted for a future blocking operation. It is to be understood that this latter function takes place only after the mold half 70 has been swung outwardly on the hinge 71.

The blocking procedure is as follows:

Lens blanks L, having the finished RP curves and the semifinished or reference surfaces 29 thereon as illustrated in Fig. 5, are positioned in each of the mold halves 69 and 70, Fig. 10, and are held therein by the vacuum system embodying the troughs 76 and 77 and the lateral openings 78, 78a. A block C is inserted into the cavity of mold half 69 and fitted upon shaft 80. Mold half 70 is then swung about hinge 71 to its closed position of registry with mold half 69 as shown in Fig. 10 and a supply of pitch or any other suitable bonding agent is injected through one or more appropriate openings 90 in mold half 70 to fill the spacing between blanks L and the peripheral mounting surface of block C. In so doing, it can be seen, Fig. 10, that the pitch or other bonding agent will also fill in around each of the finished reading portions of blanks L. This filling in, will then provide a protective coating for said reading portions during the abrading and polishing operations of the DP to follow. It may be desirable, however, in some instances to avoid the covering of the reading portions of blanks L. In such a case, the opening 90 between the side walls of the mold halves and the reading portions of blanks L would be arranged to restrict the flow of pitch to only the space between the blanks L and the block C.

After injecting the pitch or the like into mold 68 and allowing same to cool sufficiently to bond blanks L to block C, the upper mold half 70 is swung open and block C, having blanks L attached thereto, is ejected from mold half 69 in the manner described above.

Figure 12:
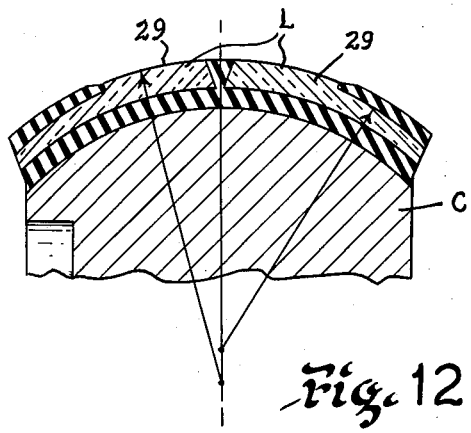
Fig. 12 is a fragmentary sectional view of a pair of blocked lens blanks which diagrammatically illustrate their related blocked positions.

Referring now to Fig. 12, it can be seen that the blocked lens blanks L are in close double row edge to edge relation with each other. The various described components of the blocking mold 68 are so controlled as to cause each row of the resultant blocked lens blanks L to have their DP and RP radii of curvatures arranged to lie on a common central axis whereby the surfaces 29 of both rows of blanks can then be abraded simultaneously by a single tool to a predetermined common radius of DP curvature having its center of curvature lying on the optical axis of the lens and monocentric with the RP curve.

A particular feature of this invention lies in the fact that it is possible to provide a plurality of lens blanks having varying RP curvatures each with the same DP curvature, said blanks may be intermixed as to RP and all blocked upon a single block for the finishing of the same DP curvature since it is obvious from the above description that the RP curvature in no way plays a part in the DP setting up or blocking of the blanks L. This feature, of course, introduces a tremendous saving in time in the production of one-piece multifocal lenses since the trade requires lens blanks having many different combinations of RP and DP curvatures.

In the above blocking procedure, the radius of curvature from the center of each of the mold half cavities to the side walls 74 and 75 is controlled in accordance with the depth of cut to be produced upon the distance portions of the blanks so as to ultimately cause the DP curvatures thereof, when fine abraded and polished, to assume the precise shapes desired while providing a ledge 27 at their optical centers of the practical minimum height mentioned above. In order to produce lens blanks having different DP curvatures in accordance with the requirements of the optical profession, a particular blocking mold 68, proportioned to provide the desired radius of curvature from its central axis to walls 74 and 75, is provided for each change of DP curvature. Likewise, blocks C of the proper corresponding radial size are also provided for use in each of the various blocking molds required.

Figure 13:
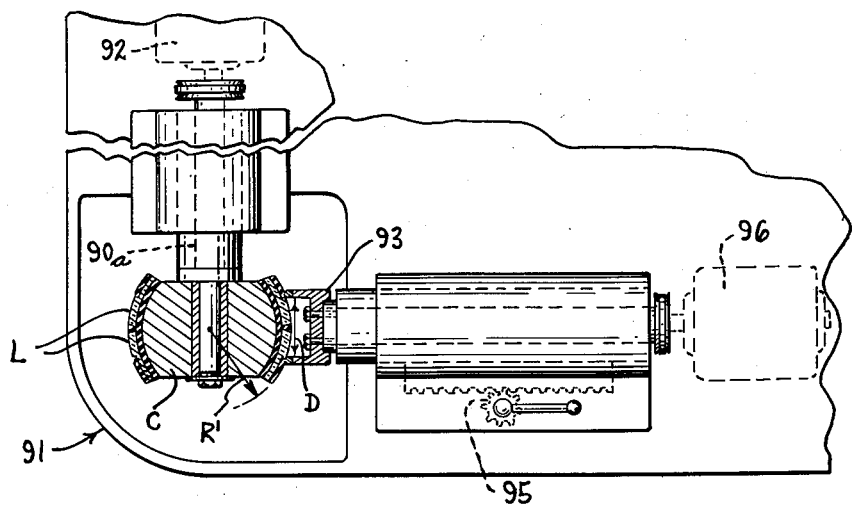
Fig. 13 is a top plan view of another of the milling devices of the invention.

The abrading of the DP curvatures of the lens blanks L is accomplished by attaching block C, having blanks L thereon, to the end of the drive shaft 90a of an abrading machine 91 such as illustrated in Fig. 13. Shaft 90a is rotated by means of a suitable motor or the like 92. A cup shaped type of abrading tool 93, aligned along an axis normal to and intersecting the axis of shaft 90a, is fed into abrading relation with the blocked lens blanks L. Tool 93, being generally similar to the previously described tools 51 and 52 is provided with an abrading edge formed to a radius of curvature R' equal to the desired radius of curvature to be applied to the distance portions of blanks L and of a diameter D sufficient to simultaneously overlap the distance portions of the adjacent blank L in both of the blocked rows thereof.

In operation, tool 93 is rotated by motor 94 and is simultaneously fed into blanks L along its axis of rotation, by a manual or automatic feed mechanism 95, a predetermined distance sufficient to simultaneously provide the proper DP curvature and reduce the height of ledge 27 on blanks L. It is to be noted that tool 93 is of the fine grinding type such as tool 53, previously described. The DP surfaces, having been previously rough ground, as described above, now require only the fine grinding operation.

It is particularly pointed out that another very important feature of the present invention lies in the particular novel manner in which the RP and DP curvatures are produced upon blanks L. Heretofore, it has been the custom to first optically finish one entire surface of such lens blanks to the curvature desired of the distance portion thereof and then proceed to produce the reading portion on said blanks by abrading and polishing one-half of the optically finished DP surface thereof. This procedure has led to the production of inferior lens blanks for many reasons. First of all, since the optically finished distance portions of the blanks must be used as a reference for finishing the reading portions and be exposed during the entire procedure, said finished surfaces often times become scratched or otherwise marred. The blanks so damaged must be rejected for future use. Furthermore, one of the principal drawbacks to the above mentioned process is the fact that in abrading the RP curvature a flaking of the glass often occurred at the dividing line or ledge between the focal fields thereof. In order to keep this flaking within tolerable limits, it became necessary to slow down the rate of removal of material from the reading portion and devise expensive and complicated tools which had to be replaced at frequent intervals.

The present invention overcomes the above difficulties by rough abrading the DP surface of the lens blanks to the curvature desired and using said rough or semifinished surface as a reference for producing the RP curvatures and in blocking for the final DP surfaces. The RP abrading operation may then proceed relatively rapidly since a slight flaking at the free edge of the dividing line between focal fields is of no consequence because in most instances such flakings will be removed during the fine abrading and polishing of the DP surfaces.

Figure 14:
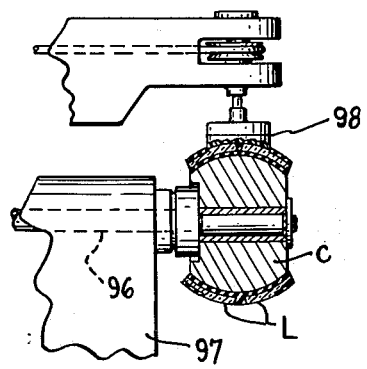
Fig. 14 is a fragmentary side view of a second type of polishing apparatus of the invention.

To continue with the process of the present invention, the distance portions of the lens blanks L, having been finely abraded by means of the device of Fig. 13, are then optically polished by means of a suitable polishing apparatus such as diagrammatically illustrated in Fig. 14. In performing this later step block C is removed from the abrading machine and secured to one end of a shaft 96 journalled in the base portion 97 of a polishing machine. A polishing tool 98 is then positioned in overlying engaging relation with the DP surfaces of the blanks L and by rotation of shaft 96 and block C during simultaneous rotation of polishing tool 98 along with the application of a suitable polishing medium to blanks L and tool 98, the blanks are optically polished in the same manner as described above in greater detail with regard to the polishing device of Fig. 9.

The finished lens blanks L are then removed from block C and are cleansed in the usual manner.

Each of the above lens blanks are adapted to be ground and polished on the concave sides thereof with any prescribed combination of curvatures in accordance with the prescriptive requirements of particular individual users and through the use of conventional abrading means similar in nature to those described in forming the first mentioned surfaces.

From the foregoing, it can be seen that improved, simplified and economical means and method have been provided for manufacturing multifocal lenses of the character described and for obtaining all the objects and advantages of the invention. However, it is apparent that many changes in the details of construction, arrangement of parts and the steps in the process may be made without departing from the spirit of the invention as expressed in the accompanying claims and the invention is, therefore, not to be limited to the exact matters shown and described as only the preferred matters have been set forth by way of illustration.

Having described my invention I claim:

1. The method of simultaneously forming a plurality of onepiece multifocal lens blanks with distance and reading focal fields of different optical powers divided by a substantially straight transversely extending line of division between said fields, comprising mounting a plurality of lens blanks each having a continuous reference surface of a controlled radius of curvature thereon about the periphery of a first rotatable blocking wheel with the axes of the curvatures of said reference surfaces lying in a single plane substantially normal to the axis of rotation of said first blocking wheel and intersecting each other at a given common point on said axis of rotation, the distance of each reference surface of each of said lens blanks from said common point being substantially the same and controlled in accordance with the finished radius of curvature to be provided on the reading fields of said lens blanks, rotating said blanks in said supported relation as a unit about the axis of said first blocking wheel, engaging a substantial area of each of said blanks during the rotation thereof with a first abrading means having a shape controlled to produce on each of said blanks a first finished spherical optical surface of a radius of curvature shorter than that of said reference surfaces and simultaneously locating an edge of said first abrading means relative to sad blanks so that the direction of movement of said blanks relative to said first abrading means will cause said edge to produce a substantially straight clifflike dividing line extending transversely of each of said lens blanks between said reading fields and the remaining portions of said reference surfaces of a height somewhat greater than that desired on the finished lens blanks, remounting two adjacent rows of said lens blanks about the periphery of a second rotatable blocking wheel with said first finished surfaces of each respective row of blanks being exposed and located toward the respective adjacent outer peripheral side areas of the second blocking wheel and with the axes of curvature of said remaining portions of said reference surfaces lying in a single plane and intersecting each other at a given common point on the axis of rotation of said second blocking wheel, said remaining portions of said reference surfaces being in adjacent relation with each other in the central area of the periphery of said second blocking wheel and each being at substantially the same distance from said common point controlled in accordance with the finished radius of curvature to be provided on the distance fields of said lens blanks, rotating said lens blanks in said supported relation as a unit about the axis of said second blocking wheel, simultaneously engaging said remaining portions of said reference surfaces of each of said rows during the rotation thereof, with second abrading means having a shape controlled to produce on each of said lens blanks a second finished spherical optical surface of a radius of curvature equal to that desired of the distance fields of said lens blanks and abrading said remaining portions of asaid reference surfaces with said second abrading means to a depth sufficient to reduce the height of the intermediate portion of each of said clifflike lines of division to a practical minimum.

2. The method of simultaneously forming a plurality of onepiece multifocal lenses having focal fields of different optical powers divided by a substantially straight transversely extending line of division between said fields, comprising mounting a plurality of lens blanks each having a continuous reference surface of a controlled radius of curvature thereon about the periphery of a first rotatable blocking wheel with the axes of the curvatures of said reference surfaces lying in a single plane substantially normal to the axis of rotation of said first blocking wheel and intersecting each other at a given common point on said axis of rotation, the distance of each reference surface of each of said lens blanks from said common point being substantially the same and controlled in accordance with the finished radius of curvature to be provided on the reading fields of said lens blanks, rotating said blanks in said supported relation as a unit about the axis of said first blocking wheel, engaging a substantial area of each of said blanks during the rotation thereof with a first abrading means having a shape controlled to produce on each of said blanks a first finished spherical optical surface of a radius of curvature shorter than that of said reference surfaces and simultaneously locating an edge of said first abrading means relative to said blanks so that the direction of movement of said blanks relative to said first abrading means will cause said edge to produce a substantially straight clifflike dividing line extending transversely of each of said lens blanks between said reading fields and the remaining portions of said reference surfaces of a height somewhat greater than that desired on the finished lens blanks, remounting two adjacent rows of said lens blanks about the periphery of a second rotatable blocking wheel with said first finished surfaces of each respective row of blanks being exposed and located toward the respective adjacent outer peripheral side areas of the second blocking wheel and with the axes of curvature of said remaining portions of said reference surfaces lying in a single plane and intersecting each other at a given common point on the axis of rotation of said second blocking wheel, said remaining portions of said reference surfaces being in adjacent relation with each other in the central area of the periphery of said second blocking wheel and each being at substantially the same distance from said common point controlled in accordance with the finished radius of curvature to be provided on the distance fields of said lens blanks, rotating said lens blanks in said supported relation as a unit about the axis of said second blocking wheel, simultaneously engaging said remaining portions of said reference surfaces of each of said rows during the rotation thereof, with second abrading means having a shape controlled to produce on each of said lens blanks a second finished spherical optical surface of a radius of curvature equal to that desired of the distance fields of said lens blanks, abrading said remaining portions of said reference surfaces with said second abrading means to a depth sufficient to reduce the height of the intermediate portion of each of said clifflike lines of division to a practical minimum and forming finished optical surfaces on the opposed sides of said lens blanks to complete said lenses.

3. The method of simultaneously forming a plurality of onepiece multifocal lens blanks with distance and reading focal fields of different optical powers divided by a substantially straight transversely extending line of division between said fields, comprising mounting a plurality of lens blanks each having a continuous reference surface of a controlled radius of curvature thereon about the periphery of a first rotatable blocking wheel with the axes of the curvatures of said reference surfaces lying in a single plane substantially normal to the axis of rotation of said first blocking wheel and intersecting each other at a given common point on said axis of rotation and with said reference surfaces of each of said lens blanks being substantially equidistant from said common point, said distance being controlled in accordance with the finished radius of curvature to be provided on the reading fields of said lens blanks, rotating said blanks in said supported relation as a unit about the axis of said first blocking wheel, engaging a substantial area of each of said blanks during the rotation thereof with a first abrading means having a shape controlled to produce on each of said blanks a first finished optical surface of a radius of curvature shorter than that of said reference surfaces and simultaneously locating an edge of said first abrading means relative to said blanks so that the direction of movement of said blanks relative to said first abrading means will cause said edge to produce a substantially straight clifflike dividing line extending transversely across each of said lens blanks between said reading fields and the remaining portion of said reference surfaces, moving said blanks in said supported relation as a unit and said first abrading means one toward the other during the rotation of said first blocking wheel an amount such as to abrade said first finished optical surfaces to a depth which will form said clifflike dividing line to a height somewhat greater than that desired on the finished lens blanks, remounting said lens blanks in adjacent double rows about the periphery of a second rotatable blocking wheel with said first finished surfaces of each respective row of blanks being exposed and located toward the respective adjacent outer peripheral side areas of the second blocking wheel and with the axes of curvature of each of the remaining portions of said reference surfaces intersecting the axis of rotation of said second blocking wheel at a given common point thereon, each of said remaining portions of said reference surfaces being in adjacent relation with each other in the central area of the periphery of said second blocking wheel and being substantially equidistant from said common point, said distance being controlled in accordance with the finished radius of curvature to be provided on the distance fields of said lens blanks, rotating said lens blanks in said supported relation as a unit about the axis of said second blocking wheel, simultaneously engaging said remaining portions of said reference surfaces of each of said rows, during the rotation thereof, with second abrading means having a shape controlled to produce on each of said lens blanks a second finished optical surface of a radius of curvature equal to that desired of the distance fields of said lens blanks and moving said blanks in said supported relation on said second blocking wheel and said second abrading means one toward the other during the rotation of said second blocking wheel an amount such as to abrade said remaining portions of said reference surfaces to a depth sufficient to reduce the intermediate portion of the height of each of said clifflike lines of division to a practical minimum.

4. The method of simultaneously forming a plurality of onepiece multifocal lens blanks with focal fields in controlled adjoining relation with each other and having a substantially straight transversely extending line of division between each of said adjoining fields, comprising forming a plurality of lens blanks with curved continuous side surfaces, mounting said blanks about the periphery of a first rotatable blocking wheel each with one of its side surfaces exposed outwardly of said wheel and the axes of each of the exposed surfaces lying in a single plane substantially normal to the axis of rotation of said first blocking wheel in intersecting relation with each other at a given common point on said axis of rotation, the distance of each exposed surface of said lens blanks from said common point being substantially the same and controlled in accordance with the desired radius of curvature to be provided on one of the fields to be finished on each of said lens blanks, rotating said blanks in said supported relation as a unit about the axis of said first blocking wheel, engaging a substantial area of each of said exposed surfaces of said blanks during the rotation thereof with a first abrading means having a shape controlled to produce on each of said blanks a first finished optical surface of a radius of curvature shorter than that of said exposed surfaces and simultaneously locating an edge of said first abrading means relative to said blanks so that the direction of movement of said blanks relative to said first abrading means will cause said edge to produce a substantially straight clifflike dividing line extending transversely across each of said lens blanks between said one of the fields and the remaining portion of said exposed surfaces thereof, moving said blanks in said supported relation as a unit during the rotation of said first blocking wheel and said first abrading means one toward the other an amount such as to abrade said first finished optical surfaces to a depth which will cause the centers of curvatures thereof to become coincident with said common point on the axis of said first blocking wheel and said clifflike dividing lines to be formed to a height somewhat greater than that desired on the finished lens blanks, remounting said lens blanks in double rows about the periphery of a second rotatable blocking wheel with said remaining portions of said exposed surfaces in adjacent side-by-side relation with each other and facing outwardly of said second blocking wheel and with said first finished surfaces of each row being located outwardly toward the respective opposed outer peripheral sides of said blocking wheel, said lens blanks being so aligned on said second blocking wheel as to cause the axes of curvature of each of the remaining portions of said exposed surfaces to intersect the axis of rotation of said second blocking wheel at a given common point thereon, each of said remaining portions of said exposed surfaces being at substantially the same distance from said common point controlled in accordance with the finished radius of curvature to be provided on another of the fields of said lens blanks, rotating said lens blanks in said supported relation as a unit about the axis of said second blocking wheel, simultaneously engaging said remaining portions of said exposed surfaces of each of said rows, during the rotation thereof, with second abrading means having a shape controlled to produce on each of said lens blanks a second finished optical surface of a radius of curvature equal to that desired of said other fields and moving said blanks in said supported relation and said second abrading means one toward the other an amount such as to abrade said remaining portions of said exposed surfaces to a depth sufficient to cause the center of curvature of the surfaces thus formed to become coincident with said common point on the axis of said second blocking wheel and the intermediate portion of the height of each of said clifflike lines of division to be simultaneously reduced to a practical minimum.

5. The method of simultaneously forming a plurality of onepiece multifocal lenses having focal fields in monaxial relation with each other and having a substantially straight transversely extending line of division between said fields, comprising mounting a plurality of lens blanks each having a continuous reference surface of a controlled radius of curvature thereon about the periphery of a first rotatable blocking wheel with the axes of the curvatures of said reference surfaces lying in a single plane substantially normal to the axis of rotation of said first blocking wheel and intersecting each other at a given common point on said axis of rotation and with said reference surfaces of each of said lens blanks being substantially equidistant from said common point, said distance being controlled in accordance with the finished radius of curvature to be provided on the reading fields of said lens blanks, rotating said blanks in said supported relation as a unit about the axis of said first blocking wheel, engaging a substantial area of each of said blanks during the rotation thereof with a first abrading means having a shape controlled to produce on each of said blanks a first finished optical surface of a radius of curvature shorter than that of said reference surfaces and simultaneously locating an edge of said first abrading means relative to said blanks so that the direction of movement of said blanks relative to said first abrading means will cause said edge to pass through the geometrical centers of said blanks and produce a substantially straight clifflike dividing line transversely across each of said lens blanks, moving said blanks in said supported relation as a unit and said first abrading means one toward the other an amount such as to abrade said first finished optical surface to a depth which will cause the centers of curvature thereof to become coincident with said common point on the axis of said first blocking wheel and said clifflike dividing lines to be formed to a height somewhat greater than that desired on the finished lens blanks, remounting said lens blanks in double rows about the periphery of a second rotatable blocking wheel with the remaining portions of said reference surfaces thereof in adjacent side-by-side relation with each other and with said first finished surfaces of each row being located outwardly toward the respective opposed outer peripheral sides of said blocking wheel and further with the axes of curvature of each of the remaining portions of said reference surfaces intersecting the axis of rotation of said second blocking wheel at a given common point thereon, each of said remaining portions of said reference surfaces being substantially equidistant from said common point and said distance being controlled in accordance with the finished radius of curvature to be provided on the distance fields of said lens blanks, rotating said lens blanks in said supporting relation as a unit about the axis of said second blocking wheel, simultaneously engaging said remaining portions of said reference surfaces of each of said rows, during the rotation thereof, with second abrading means having a shape controlled to produce on each of said lens blanks a second finished optical surface of a radius of curvature equal to that desired of the distance fields of said lens blanks, moving said blanks in said supported relation on said second blocking wheel and said second abrading means one toward the other an amount such as to abrade said remaining portions of said reference surfaces to a depth sufficient to cause the centers of curvatures of said second finished optical surfaces to become substantially coincident with said common point on the axis of said second abrading wheel and to simultaneously reduce the height of the intermediate portion of each of said clifflike lines of division to a practical minimum and forming finished optical surfaces on the opposed sides of said lens blanks to complete said lenses.

References Cited in the file of this patent

UNITED STATES PATENTS

| | | |
|---|---|---|
| 1,302,960 | Paige | May 6, 1919 |
| 2,310,925 | Bardwell et al. | Feb. 16, 1943 |
| 2,336,322 | Uhlemann | Dec. 7, 1943 |
| 2,683,342 | Dalton | July 13, 1954 |
| 2,847,804 | Calkins et al. | Aug. 19, 1958 |

FOREIGN PATENTS

| | | |
|---|---|---|
| 724,659 | Germany | Sept. 2, 1942 |